United States Patent [19]

Riederer

[11] Patent Number: 4,564,693

[45] Date of Patent: Jan. 14, 1986

[54] PROCESS FOR STABILIZING ORGANOPOLYSILOXANES

[75] Inventor: Manfred Riederer, Burghausen, Fed. Rep. of Germany

[73] Assignee: Wacker-Chemie GmbH, Munich, Fed. Rep. of Germany

[21] Appl. No.: 761,935

[22] Filed: Aug. 2, 1985

[30] Foreign Application Priority Data

Aug. 2, 1984 [DE] Fed. Rep. of Germany ....... 3428581

[51] Int. Cl.$^4$ ............................. C07F 7/08; C07F 7/18
[52] U.S. Cl. .................................... 556/401; 524/107; 524/109; 524/114; 524/265; 528/21; 528/23
[58] Field of Search ............... 556/401; 524/107, 109, 524/114, 265; 528/21, 23

[56] References Cited

U.S. PATENT DOCUMENTS 2,739,952  3/1956  Linville ........................... 556/401 X
4,203,913  5/1980  Burkhardt et al. ................ 556/401
4,460,726  7/1984  Huber et al. .................... 556/401 X Primary Examiner—Paul F. Shaver

[57] ABSTRACT

A process for stabilizing organopolysiloxanes against changes in viscosity which comprises reacting organopolysiloxanes containing phosphonitrile chlorides or reaction products thereof with at least one lithium compound which forms lithium chloride when reacted with the chlorine bonded to the phosphorous compound.

4 Claims, No Drawings

PROCESS FOR STABILIZING ORGANOPOLYSILOXANES

The present invention relates to a process for stabilizing organopolysiloxanes and more particularly to a process for stabilizing organopolysiloxanes which are prepared in the presence of phosphonitrile chlorides.

BACKGROUND OF THE INVENTION

Organopolysiloxanes which have been prepared by the condensation and/or equilibration of organosilicon compounds that contain Si-bonded oxygen in the presence of phosphonitrile chlorides have been stabilized against changes in viscosity by treating the organopolysiloxanes containing phosphonitrile chlorides or reaction products thereof which promote the condensation and/or equilibration with basic nitrogen compounds. U.S. Pat. No. 4,203,913 to Burkhardt et al, for example, describes a method for stabilizing organopolysiloxanes prepared in the presence of phosphonitrile chlorides by treating the organopolysiloxanes with ammonia or amine compounds.

When organopolysiloxanes containing phosphorus compounds are treated with tertiary compounds (cf. U.S. Pat. Nos. 3,398,176 and 3,839,388), the resultant organopolysiloxanes have a tendency to become discolored, i.e., they first turn yellow and then brown, when heated to temperatures above 150° C.

Therefore, it is an object of the present invention to stabilize organopolysiloxanes against changes in viscosity. Another object of the present invention is to stabilize organopolysiloxanes against changes in viscosity which have been prepared in the presence of phosphonitrile chlorides. Still another object of the present invention is to provide a method for stabilizing organopolysiloxanes prepared in the presence of phosphonitrile chlorides so that they remain colorless and clear for at least 30 days at temperatures up to 150° C. and remain clear for at least 6 months at room temperature. A further object of the present invention is to provide a method for stabilizing organopolysiloxanes prepared in the presence of phosphonitrile chlorides which are free of an unpleasant odor resulting from the use of an amine to stabilize the organopolysiloxanes.

SUMMARY OF THE INVENTION

The foregoing objects and others, which will become apparent from the following description are accomplished in accordance with this invention, generally speaking, by providing a method for stabilizing organopolysiloxanes prepared by condensation and/or equilibration in the presence of phosphonitrile chlorides or reaction products thereof against changes in viscosity which comprises reacting the phosphorous compounds with at least one lithium compound, which yields lithium chloride on reaction with the chlorine bonded directly to phosphorous.

DESCRIPTION OF THE INVENTION

Organopolysiloxanes which are stabilized against changes in viscosity are preferably those of the general formula $$AO(SiR_2O)_mA,$$

where R represents the same or different monovalent hydrocarbon radicals or substituted monovalent hydrocarbon radicals or hydrogen, with the proviso that there is a hydrocarbon radical also bonded to each silicon atom to which hydrogen is directly bonded, and A represents hydrogen or a radical of the formula $$-SiR_aR'_{3-a},$$

in which R is the same as above, R' is a monovalent hydrocarbon radical or a substituted monovalent hydrocarbon radical bonded to the silicon via oxygen and a is 0, 1, 2 or 3, and m is an integer having a value of at least 50.

The organopolysiloxanes represented by the general formula above, may also contain up to 5 mole percent of siloxane units other than the diorganosiloxane units of the formula $SiR_2O$. Generally, these other siloxane units are in the form of impurities that can be avoided only with more or less difficulty. Such other siloxane units are units of the formula $RSiO_{3/2}$, $SiO_{4/2}$ units or monoorganosiloxane units having the above formula and $SiO_{4/2}$ units, in which R is the same as R above.

Examples of monovalent hydrocarbon radicals represented by R or of SiC-bonded hydrocarbon radicals in the organopolysiloxanes to be stabilized according to this invention are alkyl radicals, such as methyl, ethyl, n-propyl, isopropyl, n-butyl and sec-butyl radicals; alkenyl radicals, such as the vinyl and allyl radicals; aryl radicals, such as the phenyl radical; alkaryl radicals, such as the tolyl and xylyl radicals; and aralkyl radicals, such as the benzyl radical.

Examples of substituted monovalent hydrocarbon radicals represented by R or SiC-bonded substituted hydrocarbon radicals in the organopolysiloxanes to be stabilized according to this invention are cyanoalkyl radicals, such as the beta-cyanoethyl radical, and halogenated hydrocarbon radicals, such as haloalkyl radicals, for example, the 3,3,3-trifluoropropyl radical, and haloaryl radicals, such as o-, -m- and p-chlorophenyl radicals.

Due to their availability, preferably at least 50 percent of the number of SiC-bonded organic radicals in the organopolysiloxanes to be stabilized according to this invention are methyl radicals. The remaining SiC-bonded organic radicals are preferably vinyl or phenyl radicals. Moreover, the presence of Si-bonded hydrogen may be preferred.

Examples of substituted and unsubstituted hydrocarbon radicals represented by R' which are bonded to silicon via oxygen are the methoxy, ethoxy and methoxyethyleneoxy ($CH_3OCH_2CH_2O-$) radicals.

The viscosity of the organopolysiloxanes is generally from about $1 \times 10^3$ to $5 \times 10^7$ mPa.s at 25° C., and it is against changes in this viscosity that the organopolysiloxanes can be stabilized according to this invention.

The process according to this invention is of the greatest importance for those organopolysiloxanes having the above-mentioned formula, in which A is hydrogen or a radical of the formula $-SiR_3$, such as the trimethylsilyl or dimethylvinylsilyl radical, or in which a portion of A represents hydrogen and the remainder of A represents radicals of the formula $-SiR_3$.

One type of organopolysiloxane can be stabilized, or mixtures of at least two different types of organopolysiloxanes can be stabilized by the process of this invention.

The phosphonitrile chlorides present in the organopolysiloxanes which, according to this invention, are stabilized against changes in viscosity, can be those which have been prepared by reacting 400 parts by weight of phosphorous pentachloride with 130 parts by weight of ammonium chloride [see, for example, "Berichte der Deutschen Chemischen Gesellschaft" (Reports of the German Chemical Society), 57th year, 1924, page 1345], and/or those which are obtainable by reacting 2 mols of phosphorous pentachloride with 1 mol of ammonium chloride (see, for example, U.S. Pat. No. 3,839,388 to Nitzsche et al). Phosphonitrile chlorides of the latter type are preferred.

It is not clear whether organopolysiloxanes which have been obtained by condensation or equilibration, or by condensation and equilibration of organosilicon compounds that contain Si-bonded oxygen with phosphonitrile chlorides do indeed contain, before stabilization, phosphonitrile chlorides or whether, in addition to or instead of phosphonitrile chlorides, they contain reaction products thereof with, for example organopolysiloxanes which promote condensation and/or equilibration. Consequently, it is not possible to indicate the nature of the reaction products which are present in the organopolysiloxanes that have been obtained by condensation or equilibration of organosilicon compounds which contain Si-bonded oxygen in the presence of phosphonitrile chlorides and, therefore, should not be totally excluded.

The preparation of organopolysiloxanes containing phosphonitrile chlorides or reaction products thereof which promote the condensation or equilibration of organopolysiloxanes is generally known and is described in detail, for example, in U.S. Pat. No. 2,830,967 to Nitzsche et al; U.S. Pat. No. 2,990,419 to Nitzsche et al; U.S. Pat. No. 3,186,967 to Nitzsche et al; British Pat. No. 10 49 188, published Nov. 23, 1966, Wacker-Chemie GmbH; U.S. Pat. No. 3,398,176 to Nitzsche et al; U.S. Pat. No. 3,706,775 to Nitzsche et al; U.S. Pat. No. 3,652,711 to Triem et al; Canadian Pat. No. 809,229 to Wacker-Chemie GmbH and U.S. Pat. No. 3,839,388 to Nitzsche et al in which the disclosure of each of the above references is incorporated herein by reference and made a part of this application.

In preparing organopolysiloxanes in the presence of phosphonitrile chlorides or reaction products thereof which promote condensation and/or equilibration, the phosphonitrile chlorides are preferably used in an amount of from 0.001 to 0.05 percent by weight, more preferably from 0.02 to 0.03 percent by weight, based on the total weight of the organosilicon compounds employed in the condensation and/or equilibration.

An example of a lithium compound which forms lithium chloride on reaction with the chlorine bonded directly to phosphorous is preferably lithium hydroxide. The lithium hydroxide can be formed also in situ by the reaction of, for example, n-butyl lithium with water, which is present from the condensation of the organopolysiloxanes.

Other examples of lithium compounds which yield lithium chloride on reaction with chlorine bonded directly to phosphorus or yield lithium hydroxide during the reaction with water which is present as a result of the condensation of the organopolysiloxanes are lithium carbonate, lithium bicarbonate, lithium oxide, lithium hydride, lithium formate, lithium acetate, lithium methoxide, lithium ethoxide and lithium methylsiliconate.

It is possible to use one type of lithium compounds which yields lithium chloride on reaction with chlorine bonded directly to phosphorous, or it is possible to use a mixture of at least two different types of lithium compounds which yield lithium chloride on reaction with chlorine bonded directly to phosphorous. Preferably, the lithium compound is used in an amount of from 1 to 5 gram-atoms of lithium per gram-atom of phosphorous present in the phosphonitrile chlorides used in the preparation of the organopolysiloxanes.

It is possible, in the process of this invention, to use the lithium compound in the form of a solution in a solvent which is inert towards the compound. An example of such a solvent in the case of lithium hydroxide is water. In the case of n-butyllithium, examples of such solvents are n-pentane and dimethylpolysiloxanes terminated by trimethylsiloxy groups, which are liquid at room temperature. It is also possible to use suspensions of, for example, lithium hydroxide, for example, in dimethylpolysiloxanes terminated by trimethylsiloxy groups, which are liquid at room temperature.

The process of this invention is preferably carried out at from 0° C. to 200° C., especially at from room temperature to 180° C. The process of this invention can be carried out at ambient atmospheric pressure, that is to say, for example, at 1020 hPa (abs.), or at higher or lower pressures. The process according to the invention can be carried out batch-wise, semicontinuously or continuously.

In order to ensure a good homogeneous distribution, it is preferred that the organopolysiloxanes containing phosphonitrile chlorides or reaction products thereof which promote the condensation and/or equilibration of organopolysiloxanes and the lithium compound used according to this invention be mixed, for example in a planetary mixer, a double-screw kneader or a toothed-wheel pump.

The organopolysiloxanes stabilized according to this invention can be used for all purposes for which organopolysiloxanes stabilized according to processes known heretofore could also be used, for example as thread lubricants, for the manufacture of organopolysiloxane elastomers and for coatings which are adhesive repellents.

The phosphonitrile chloride used in the following examples is prepared in the following manner:

A mixture containing 417 g (2 mol) of phosphorous pentachloride and 53.5 g (1 mol) of ammonium chloride in 1000 ml of tetrachlorethane is boiled under reflux for 12 hours to form a pale yellow solution. The volatile materials are removed from the resultant solution at 160° C. while lowering the pressure to approximately 1.33 hPa (abs.). A residue of yellowish crystals is obtained which consists substantially of a compound having the formula

EXAMPLE 1

(a) In a kneader, a mixture consisting of 2600 g of a dimethylpolysiloxane having an Si-bonded hydroxyl group in each terminal unit and having a viscosity of 100 mm$^2$.s$^{-1}$ at 25° C., 325 g of a dimethylpolysiloxane terminated by trimethylsiloxy groups and having a viscosity of 20 mm$^2$.s$^{-1}$ at 25° C., and 5.72 ml of 0.825 percent by weight solution of phosphonitrile chloride in methylene chloride, is heated at 80° C. at 13 hPa (abs.) until a dimethylpolysiloxane terminated by trimethylsiloxy groups and having a viscosity of 1000 mPa.s at 25° C. is formed.

(b) At room temperature and at approximately 1000 hPa (abs.), 0.29 g of a 15 percent by weight solution of n-butyllithium in n-pentane is kneaded into the organopolysiloxane prepared in (a) above, and then the pentane is evaporated at $10^{-3}$ hPa (abs.).

The organopolysiloxane stabilized in this manner is clear and colorless. Even after the organopolysiloxane has been stored for 12 months at room temperature, no change in the viscosity and in the appearance of the organopolysiloxane can be detected.

EXAMPLE 2

(a) About 100.0 kg per hour of a dimethylpolysiloxane having an Si-bonded hydroxyl group in each terminal unit and having a viscosity of 140 mm$^2$.s$^{-1}$ at 25° C., 6.25 kg per hour of a dimethylpolysiloxane terminated by trimethylsiloxy groups and having a viscosity of 20 mm$^2$.s$^{-1}$ at 25° C., and 220 ml per hour of 0.825 percent by weight solution of phosphonitrile chloride in methylene chloride, are fed continuously into a double-screw kneader having a 140 cm long reaction zone maintained at 150° C. and at 6.7 hPa (abs.). A dimethylpolysiloxane terminated by trimethylsiloxy groups and having a viscosity of 20,000 mPa.s at 25° C. passes via a delivery screw into the delivery tube.

(b) The resultant organopolysiloxane, which is still at a temperature of almost 150° C., is mixed at the delivery tube by means of a toothed-wheel pump with 220 ml per hour of a solution containing 1.7 g of n-butyllithium (0.185 g of lithium), 9.65 g of n-pentane and 208.65 g of dimethylpolysiloxane terminated by trimethylsiloxy groups and having a viscosity of 350 mPa.s at 25° C.

The organopolysiloxane stabilized in this manner is clear and colorless. Even after the organopolysiloxane has been stored for 12 months at room temperature, no change in the viscosity and in the appearance of the organopolysiloxane can be detected.

EXAMPLE 3

(a) The procedure described in Example 1 is repeated, except that 0.65 ml of a 25 percent by weight solution of the phosphonitrile chloride in methylene chloride is used instead of the 5.72 ml of the 0.825 percent by weight solution of the phosphonitrile chloride.

(b) The procedure of Example 1(b) is repeated, except that only 260 g of the organopolysiloxane is used, and 0.26 ml of a 25 percent by weight solution of lithium hydroxide in water is used instead of the solution of n-butyllithium.

The organopolysiloxane stabilized in this manner is clear and colorless. Even after the organopolysiloxane has been stored for 6 months at room temperature, no change in the viscosity and in the appearance of the organopolysiloxane can be detected. The results of further stabilization are given in the following table.

Comparison Example

The process described in Example 3 is repeated, except that 0.26 ml of a 25 percent by weight solution of tert-octylamine in methylene chloride is used instead of the solution of lithium hydroxide.

The organopolysiloxane stabilized in this manner is clear and colorless. After the organopolysiloxane has been stored for 6 months, it still has the same viscosity of 1000 mPa.s and is still colorless. After this period of storage, however, it is cloudy. The results of further stabilization tests are illustrated in the table.

TABLE

| | Appearance of the Organopolysiloxane | |
| --- | --- | --- |
| | After 6 months at −20° C. | After 30 days at 150° C. |
| Example 3 | Colorless, Clear | Colorless, Clear |
| Comparison Example | Colorless, Cloudy | Colorless, Cloudy |

EXAMPLE 4

(a) About 100 kg per hour of a dimethylpolysiloxane having an Si-bonded hydroxyl group in each terminal unit and having a viscosity of 95 mm$^2$.s$^{-1}$ at 25° C. and 70 ml per hour of a 2.5 percent by weight solution of phosphonitrile chloride in methylene chloride is fed continuously into a double-screw kneader having a 140 cm long reaction zone maintained at 150° C. and 6.7 hPa (abs.). A dimethylpolysiloxane having an Si-bonded hydroxyl group in each terminal unit and having a value, determined in a Brabender plastograph at 25° C. and at 60 revolutions per minute, of 5200 Nm passes via a delivery screw into the delivery tube.

(b) The highly viscous organopolysiloxane prepared in (a) above, which is still at a temperature of almost 150° C., is mixed at the delivery tube by means of a toothed-wheel pump with 140 ml per hour of a 5 percent by weight solution of lithium hydroxide in water.

The organopolysiloxane stabilized in this manner is clear and colorless. Even after the organopolysiloxane has been stored for 6 months at room temperature, no change in the viscosity and in the appearance of the organopolysiloxane can be detected.

What is claimed is:

1. A process for stabilizing organopolysiloxanes prepared by condensation and/or equilibration of organosilicon compounds having Si-bonded oxygen in the presence of phosphorous compounds consisting of phosphonitrile chlorides and reaction products thereof, which comprises reacting the phosphorous compounds present in the organopolysiloxanes with at least one lithium compound which yields lithium chloride on reaction with chlorine bonded to phosphorous.

2. The process of claim 1, wherein the lithium compound is lithium hydroxide.

3. The process of claim 1, wherein the lithium compound is used in an amount of from 1 to 5 gram-atoms of lithium per gram-atom of phosphorous in the phosphonitrile chlorides.

4. The process of claim 3, wherein the lithium compound is used in an amount of from 1 to 5 gram-atoms of lithium per gram-atom of phosphorous in the phosphonitrile chlorides.

* * * * *